United States Patent
Hayden

(10) Patent No.: US 8,523,200 B2
(45) Date of Patent: Sep. 3, 2013

(54) SULKY FORCE EQUALIZER AND ANALYZER

(76) Inventor: David Wayne Hayden, Newburg, MD (US)

( * ) Notice: Subject to any disclaimer, the term of this patent is extended or adjusted under 35 U.S.C. 154(b) by 64 days.

(21) Appl. No.: 13/251,842

(22) Filed: Oct. 3, 2011

(65) Prior Publication Data

US 2012/0205886 A1   Aug. 16, 2012

Related U.S. Application Data

(60) Provisional application No. 61/463,326, filed on Feb. 16, 2011.

(51) Int. Cl.
*B62C 1/00* (2006.01)

(52) U.S. Cl.
USPC ........................... 280/63; 280/65; 280/47.131

(58) Field of Classification Search
USPC .............. 280/63, 65, 47.131, 47.15; 54/39.1, 54/2, 3, 69
See application file for complete search history.

(56) References Cited

U.S. PATENT DOCUMENTS

| | | | |
|---|---|---|---|
| 792,069 A * | 6/1905 | Parker | 54/3 |
| 965,916 A * | 8/1910 | Magoon | 454/219 |
| 4,473,991 A * | 10/1984 | La Mura et al. | 54/2 |
| 4,480,428 A * | 11/1984 | Gilbertson | 54/69 |
| 4,662,157 A * | 5/1987 | Frigon et al. | 54/2 |
| 4,986,059 A * | 1/1991 | Boutilier | 54/2 |
| 5,056,301 A * | 10/1991 | Garland et al. | 54/2 |
| 6,446,419 B1 * | 9/2002 | Terwilliger | 54/2 |
| 6,588,186 B2 * | 7/2003 | Knox | 54/69 |
| 7,487,980 B2 * | 2/2009 | Goddard et al. | 280/63 |
| 7,818,951 B1 * | 10/2010 | Boutilier | 54/2 |
| 2006/0091630 A1 * | 5/2006 | Goddard et al. | 280/63 |

* cited by examiner

*Primary Examiner* — Hau Phan

(57) ABSTRACT

A sulky force equalizer comprised of two actuators, connected together, and each actuator is connected to a sulky shaft. The two actuators work together in a pressurized feedback loop that captures and uses errant sulky-and-horse forces to counterbalance any imbalance of pulling forces from the horse; reduces the effort required by a horse to control, stabilize and pull the sulky; and correct any imbalance of the sulky shaft positions. The sulky force equalizer also operates in force analysis mode to test forces in the actuators.

16 Claims, 9 Drawing Sheets

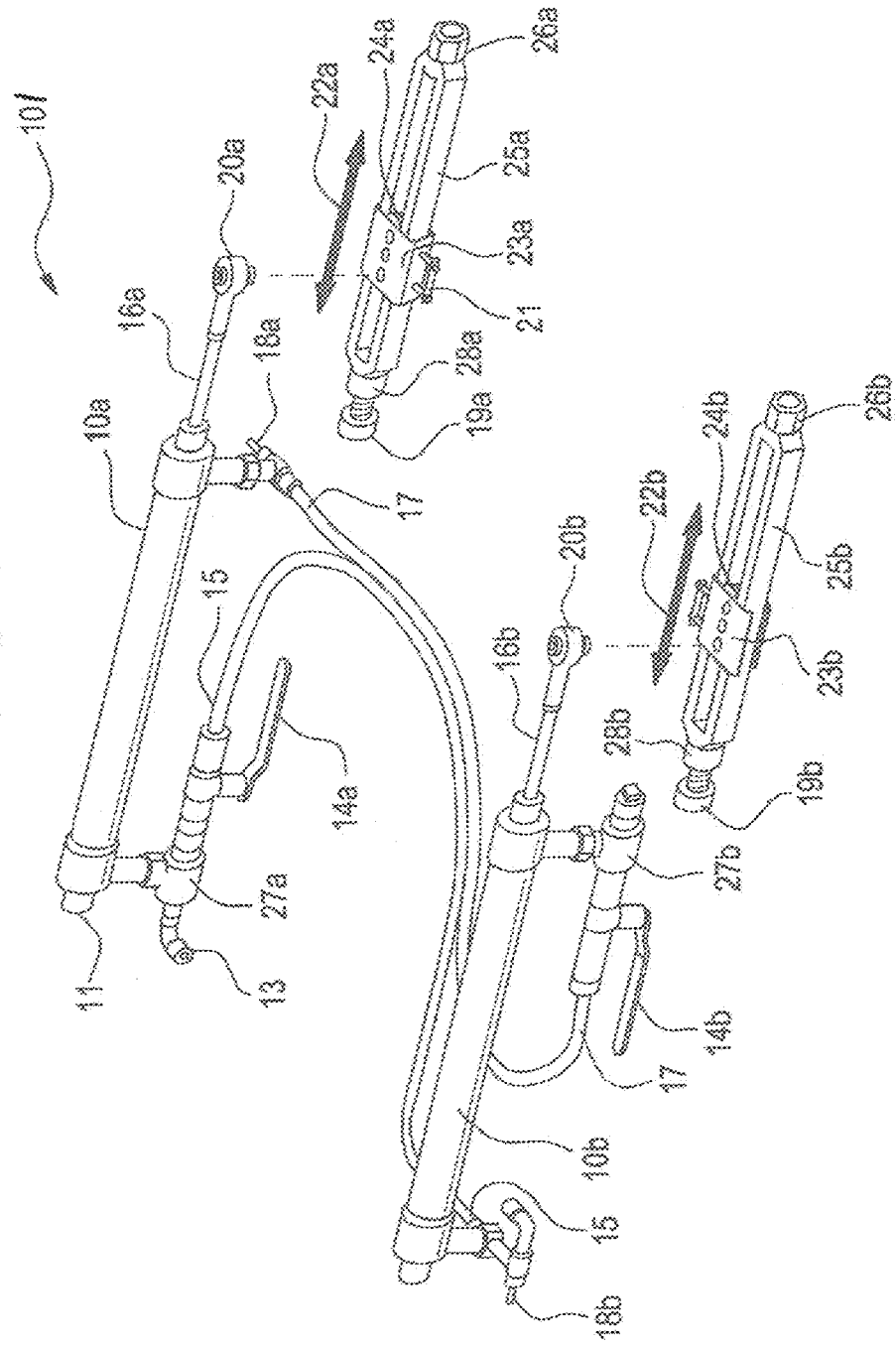

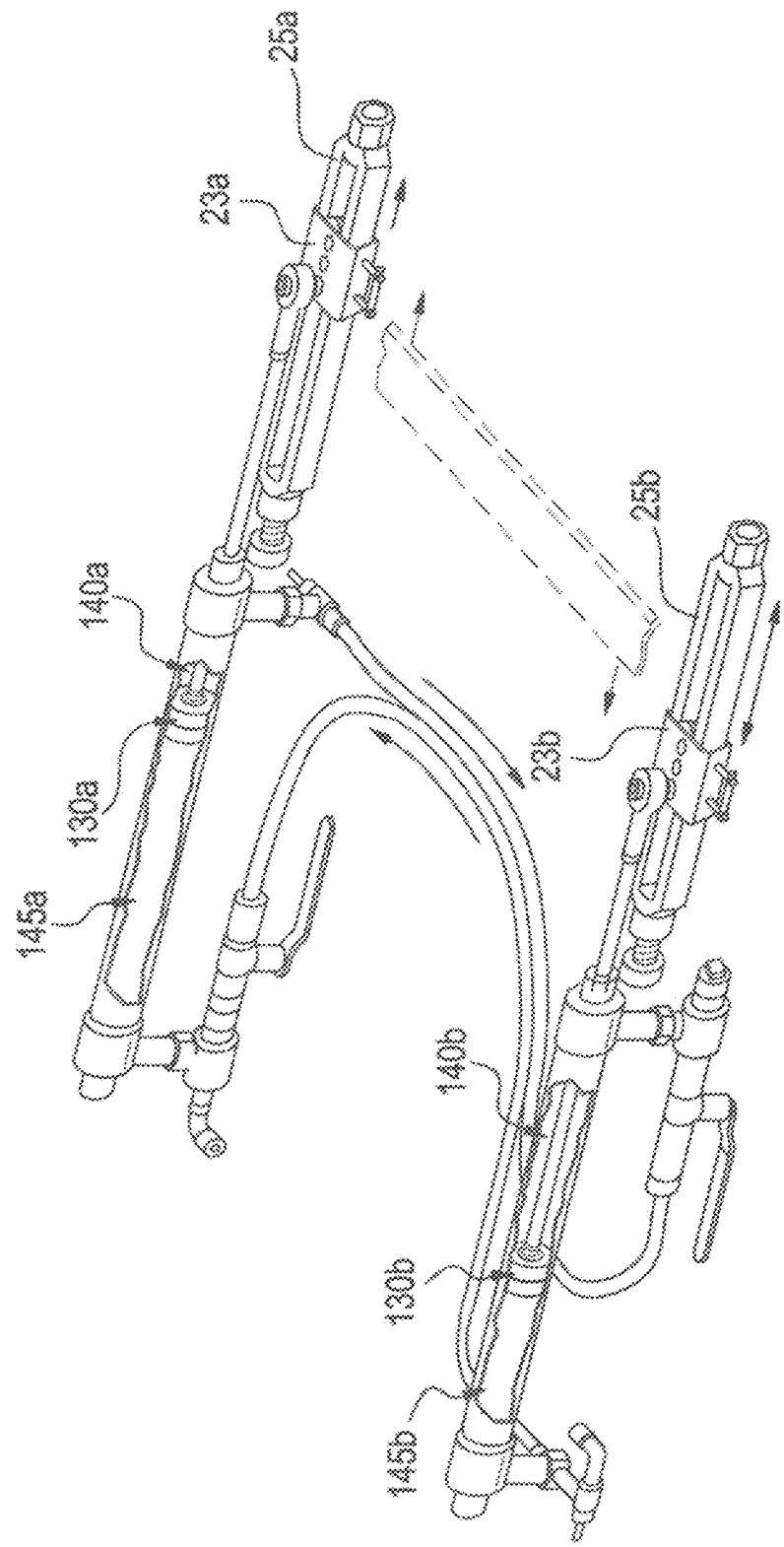

SULKY FORCE EQUALIZER AND ANALYZER

CROSS-REFERENCE TO RELATED PATENTS

The present application claims the benefit of the provisional application 61/463,326 filed Feb. 16, 2011.

FIELD OF THE INVENTION

This invention relates generally to a racing sulky apparatus that minimizes resistance and reduces the effort required by the horse to control and stabilize the sulky. More particularly, the invention is an apparatus that provides force equalization between sulky and horse, and a test mode that provides an analysis of the forces between the horse and sulky.

BACKGROUND OF THE INVENTION

In harness racing, a racehorse pulls a two-wheeled cart, or sulky, having a pair of shafts. The shafts are attached to a harness saddle circling the horse's body. As the horse trots, it rolls from side to side, and this motion is transmitted to the sulky through the shafts tending to cause the sulky to fish-tail, or zig-zag, on the track, and put a strain or drag on the horse's forward moving energy. Any side-to-side motion transmitted from the horse to the sulky detracts from the forward motion of the horse.

Another drag on the horse's forward motion occurs when sulky makes a turn or changes lanes. The connection between sulky and horse, the shafts, creates a barrier to the ability of the horse and sulky to negotiate a turn. When the horse enters a turn at a high rate of speed the sulky skids on the tracks and this outside force pulls on the sulky, contributing to horse-and-sulky loss of distance, time and racing position.

Finally, there are a number of forces that are always trying to separate the stationary-prone sulky from the moving horse, i.e., friction, wind resistance, gravity, etc.

It is desirable to reduce or eliminate these forces and movements that detract from the forward motion of horse and sulky, i.e., the side-to-side movements of the horse, skidding of the sulky, the outward pull and skidding of the sulky in a turn, and forces that try to separate the stationary-prone sulky from the moving horse.

Attempts have been made to overcome the above-noted disadvantages of the conventional systems for hitching a horse to a sulky by using various ball-joint arrangements and rigid mounted bullet type connectors. U.S. Pat. No. 4,473,991 discloses a harness connector device wherein a pin secured to the harness fits into a first ball joint connected through a linking member to a second ball joint, which in turn is connected to a shaft. As a result the link member is able to move relative to the shaft and harness to permit displacement of the harness relative to the shaft tending to alleviate side-slipping of the sulky.

U.S. Pat. No. 5,056,301 issued to Garland & Boutilier discloses a sulky cart that has shafts with off-set forward end portions and it attempts to eliminate the rigid connection between harness and sulky. The sulky cart is releasably attached to an off-set elongated sleeve member with a connector assembly on the forward end of the sleeve member. The connector assembly contains a rotatable ball with a central aperture for sliding over a harness pin secured to and extending from a harness saddle. The harness pin is provided near its outer end with a locked locking device, so that the cart can be hitched to the saddle harness by sliding the harness pin and locking device through the central aperture in the ball.

Finally, Boutilier U.S. Pat. No. 7,818,951 discloses an apparatus that connects the shafts of the sulky to a harness in a manner so as to isolate racehorse motion from the racing sulky. The apparatus includes a ball joint for a rotating attachment to the harness and a threaded end for fixed attachment to the sulky shaft. A dampening piston is provided between the ball joint and the sulky shaft to provide shock absorption and thereby isolate horse movement by dampening the running, trotting, pacing, and galloping motions of the horse from the sulky.

Thus, at best, the prior art devices are force isolation devices that attempt to alleviate side-slipping of the sulky by a ball-joint arrangement, or devices that attempt to eliminate the effects of too rigid a relationship between harness and sulky, or devices that use a sulky cart with shafts having off-set forward end portions and dissipate the energy from unwanted movements of the horse and sulky.

A need exists for a device doesn't simply dissipate or isolate unwanted forces but uses the unwanted sulky-horse forces to greatly reduce the unwanted forces. The device corrects any imbalance of the shaft positions and allows the horse to pull the sulky in the forward direction alone.

Therefore, an object of the present invention is a device for connecting the shafts of a sulky to a harness saddle and having the device capture the forces of unwanted sulky movements, redirecting and converting those forces to equalize any imbalance of the sulky shaft positions and allow the horse to pull the sulky evenly in the forward direction alone. Other objects and advantages of the present invention will become apparent from the following description and accompanying drawings of a preferred embodiment thereof and from the manufacture and use of the invention.

SUMMARY

To achieve the objects of the present invention there is provided a device for connecting a sulky shaft to a harness which device comprises two double-action, actuating, tandem cylinders connected together. Each cylinder contains a piston connected to a piston rod, and the rod slides through the head of the cylinder. The piston divides the inside of the cylinder into two sealed, variable-volume chambers, and an upper and lower chamber. Each chamber has a port through which fluid enters and leaves the chamber. Tubing connects the ports of the bottom chambers, and separate tubing connects the ports of the upper chambers. Pressure in the chambers operate the piston and rod assembly as a liquid or gas enters a chamber through the ports, moving the piston forward and backward in a pressurized feedback loop that equalizes pressure in all four chambers.

It is an object of the invention to use the unwanted sulky-and-horse forces to greatly reduce those unwanted forces, correct any imbalance of the sulky shaft position, and allow the horse to pull the sulky in the forward direction alone.

It is an object of the invention to correct any lead-lag position of the sulky shaft tips, which occurs when the force of a lead shaft is greater than the lag shaft. The sulky force equalizer uses the connected tandem actuators to correct the lead-lag imbalance, shifting fluid pressure between the actuators, allowing chamber pressures to equalize, and correcting the lead-lag position of the sulky shaft tips.

It is an object of the invention to equalize any force imbalance the horse exerts on the sulky's parallel shafts.

It is another object of the invention to maintain a balanced sulky pulling force for the horse. The equalizer allows the sulky shafts to pivot freely as it tracks behind the horse and enhances the controllability of the sulky It is an object of the present invention to capture the separation forces of the sulky and horse movements, converting that force into fluid pressure, redirecting and using that converted force to equalize any imbalance of the sulky shaft positions, and let the horse pull the sulky evenly in the forward direction alone.

It is an object of the present invention to provide a device for a racing sulky that reduces sulky resistance to the horse's forward motion.

It is another object of the present invention to create a pressure sensing feedback loop that senses force differentials, captures those force differentials, and distributes the forces to correct any imbalance of the sulky shaft position, eliminating force differentials that hinder the forward motion of the horse.

An object of the present invention is to maintain evenly distributed forces between the parallel sulky shafts as a horse propels the sulky forward, and greatly reduce sulky fishtailing, skidding, and yaw wagging movement.

Another object of the present invention is to provide an ergonomic connection between the racehorse and sulky by providing a resilient connection that allows the racehorse an area of free mobility within the confines of the harness and the sulky connection.

Another ergonomic object of the present invention is the reduced amount of vibration transmitted from the sulky to the racehorse. The invention absorbs shock and vibration as it converts and equalizes the pulling force.

Still another ergonomic object of the present invention is noise reduction at the connection point of the sulky and harness. The disclosed device absorbs shock and vibration and balances the force applied by the horse to the sulky, resulting in a significant noise reduction at the sulky and harness connection point.

Other aspects and features of the present invention will become apparent to those ordinarily skilled in the art upon review of the following description of an embodiment of the invention in conjunction with the accompanying figures.

BRIEF DESCRIPTION OF THE DRAWINGS

FIG. 3 shows an exploded view of the actuator, the cross-connected tubing, and the clevis carriage assembly of the disclosed embodiment;

FIG. 6B shows an exploded cut-away view of actuators with a greater amount of force applied to the left clevis carriage by the horse.

DETAILED DESCRIPTION

Figure 1:
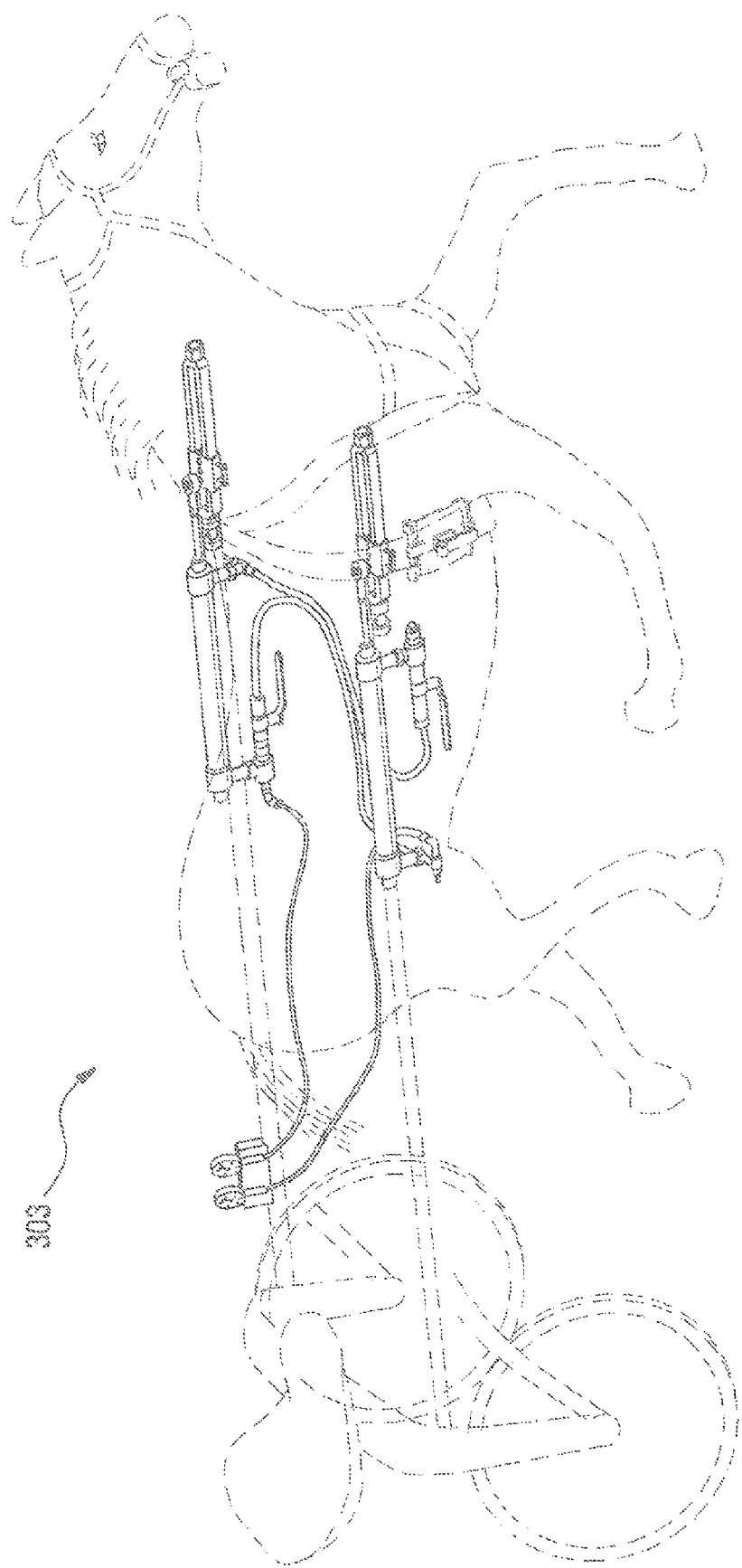
FIG. 1 shows an illustration of a racing sulky and horse (seen by dotted line) showing the attachment of the shafts of the sulky to the harness saddle on the horse in accordance with an embodiment of the invention (seen in solid line)

One representative form of a racing sulky configured to embody the concepts of the invention is seen in FIG. 1. The connecting device, a sulky force equalizer 303, is mounted in this embodiment as a saddle mount actuator. However, the actuator can be mounted a number of ways, including in a nose mounted actuator or an actuator rear mounted and it would operate the same way.

In FIG. 1 the sulky and horse are seen in dotted lines and an embodiment of the present invention is seen in solid line 303, attached to the shafts of the sulky. As noted, the saddle mount sulky force equalizer is the connecting device between the racehorse and sulky.

Figure 2:
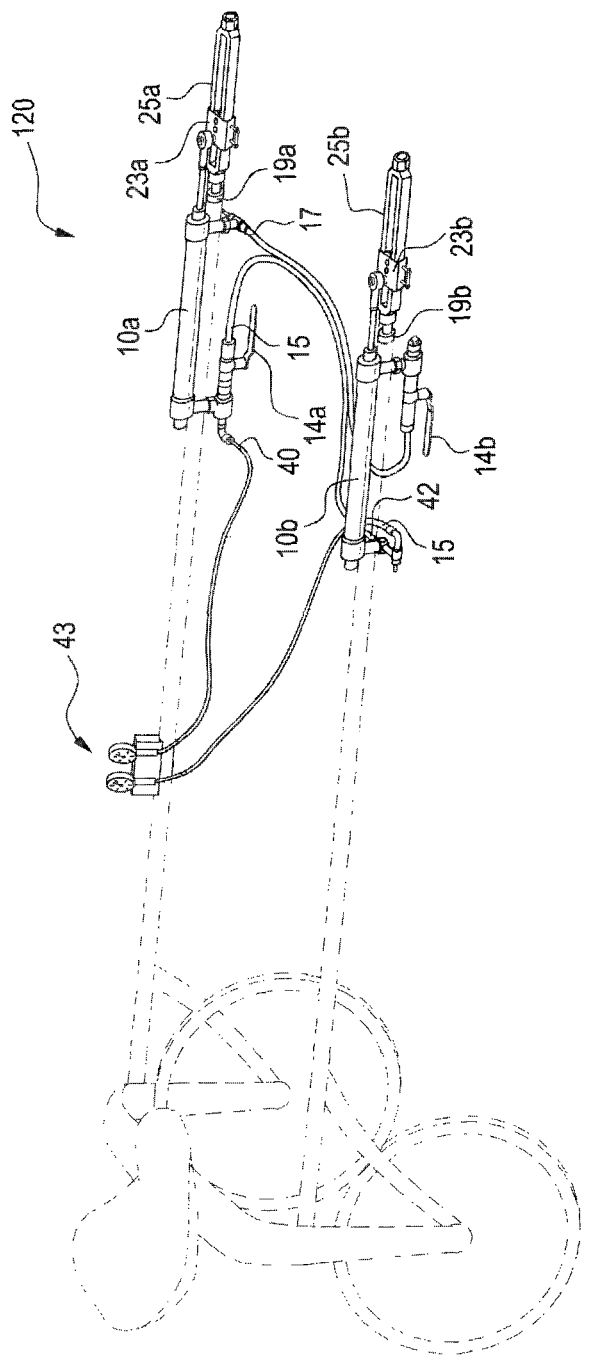
FIG. 2 shows a close-up illustration of the actuator assembly of the embodiment.

FIG. 2 shows the sulky force equalizer 120 connected to the shafts of the sulky, and configured in a test mode. The test mode is set by adjusting the left and right pressure equalization ball valves 14a, b. Additionally, in the test mode, pressure gauge tubing 40 and 42 are connected to pressure gauges 43. The sulky force equalizer can be configured with or without the pressure gauges, i.e., in a test mode or in a racing mode. In the racing mode the force equalizer does not use the pressure gauges 43 or tubing 40 and 42.

In the FIG. 2 embodiment left, right actuator assemblies 10a, b are connected to the left and right clevis carriages 23a, b, and the clevis carriages 23a, b move along left and right clevis guide tracks 25a, b. Additionally, shaft adaptors 19a, b attach the clevis guide tracks 25a, b to the sulky shafts, and also attach the sulky shafts to the left and right actuator assemblies 10a, b. (Throughout the drawings (a) refers to left sided components and (b) to right sided components.)

FIG. 3 is an exploded view of the sulky force equalizer in a racing mode 101. In the racing mode the sulky force equalizer consists of the following three major components: clevis carriages 23a, b, clevis guide tracks 25 a, b, and tandem actuators 10a, b.

Replacing the prior art rigid type shaft hitch, the clevis guide tracks 25a, b are attached to the tips of the sulky shafts by the shaft adapters 19a, b, the adapters are screwed into the clevis guide track receivers 28a, b, and the head portion of the adapters 19a, b are inserted and secured into the sulky shafts. The clevis guide tracks 25a, b have an upper rail and a lower rail which allows the clevis carriages 23a, b to freely travel forward and backward, creating a resilient connection, able to respond to the motions of the horse.

In the disclosed embodiment, clevis carriages 23a, b are constructed of a two piece steel housing (see FIG. 4a) the inner housing 7, and outer housing 31. Enclosed within the inner and outer housing is a bank of three roller bearings 24. The roller bearings 24 travel forward and backward within the clevis guide track, and three multipurpose bolts 30 serve as bearing axles, actuator rod connections and device assembly bolts. Clevis 21 is welded onto the inner carriage housing (see FIG. 3, as noted, there is a clevis connected to a clevis carriage on both sides of the sulky force equalizer.)

The carriage housing and clevis 21 travel on the exterior portion of the clevis guide track. Clevis 21 attaches to the coupler on the left side of the horse's harness (as noted, the same clevis, coupler, and harness configuration would also be on the right side of the horse). Thus, clevis carriage 23 is free to respond to forces from the horse, sulky and actuator pistons.

Figure 5:
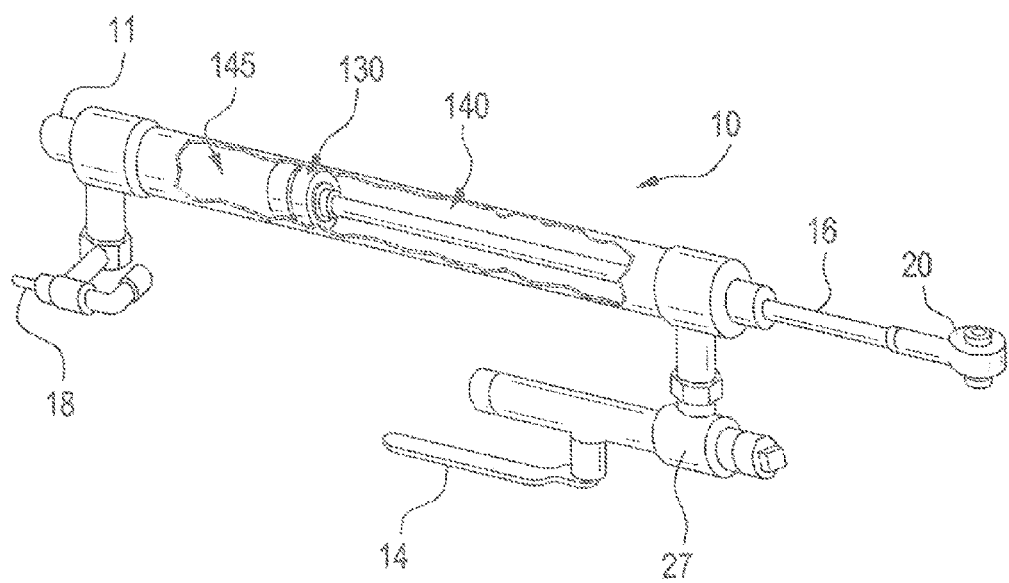
FIG. 5 shows an exploded view of actuator components.

In the disclosed embodiment, industry standard miniature pneumatic actuators with stainless steel cylinders are used for the tandem actuators 10a, b. The tandem actuators 10a, b are mounted on the sulky shafts. Actuator rods 16a, b extend out of the actuators and attach to the clevis carriage 23a, b. The mounting hardware used to attach the actuators to the sulky shaft are foot brackets 11 (as seen in FIG. 5) that connect to a post which extends perpendicular from each sulky shaft. Foot brackets 11 connect the actuator cylinders 10a, b to the sulky shafts and allows the sulky force equalizer to adjust the position of the sulky shafts.

Figure 6A:
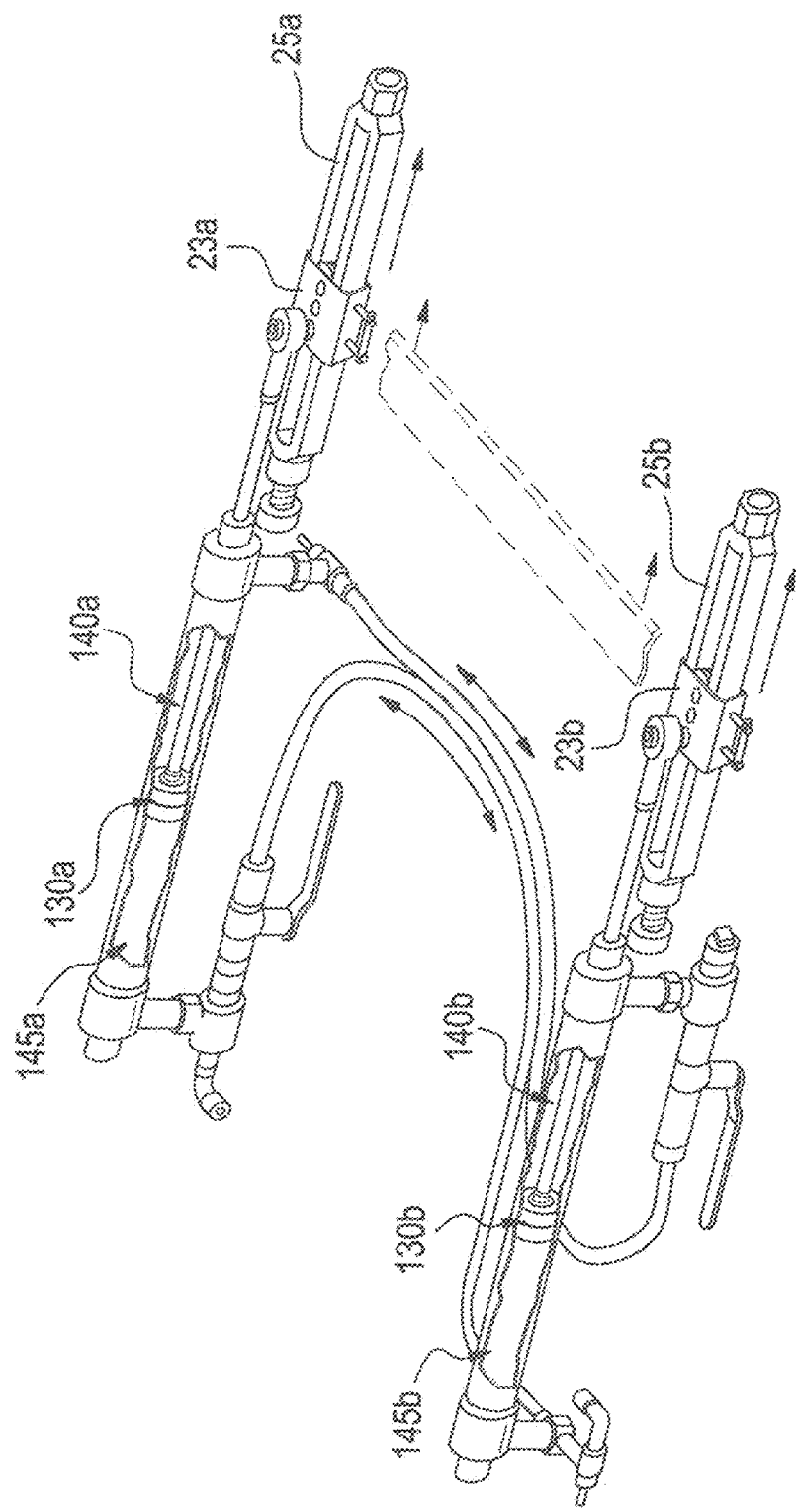
FIG. 6A shows an exploded cutaway view of the actuators with an even amount of force applied to the clevis carriage by the horse.

As seen in FIGS. 6a, b, and c, within the tandem actuators are fluid pistons 130a, b. The fluid pistons respond directly and proportionally to the position of the clevis carriage 23a, b through connecting rods 16a, b. Left and right connectors 20a, b attach the connecting rods 16a, b to each clevis carriage 23a, b.

As seen in FIG. 3, clevis 21 is attached to the left side of the horse and also to the left clevis carriage (same as the right side) and the clevis carriages 23a, b move on the left and right bearings 24a, b, along the left and right clevis guide tracks 25a, b. The clevis carriages 23a, b move in the clevis travel direction 22, forwards and backwards, to the left and right travel limiting bumper, like travel limiting bumper 26 seen in FIG. 4.

In FIG. 3, clevis carriages 23a, b are also connected to left and right rod connectors 20a, b. The rod connectors 20a, b are connected to the left and right connecting rods 16a, b which connect to pistons within the left and right actuators 10a, b. As pistons within actuators 10a, b move forward or backward fluid is pumped into upper tubing 15 or lower tubing 17, depending on the movement of the pistons.

The clevis guide tracks 25a, b, of this embodiment, are approximately six inches in length and allow the clevis carriages 23a, b to travel approximately five inches. These lengths will vary depending on the measured forces exerted by a particular horse and sulky combination.

FIG. 3 also shows the left test gauge connections 13 where tubing is placed when the force actuator is set in the test mode.

Figure 4A:
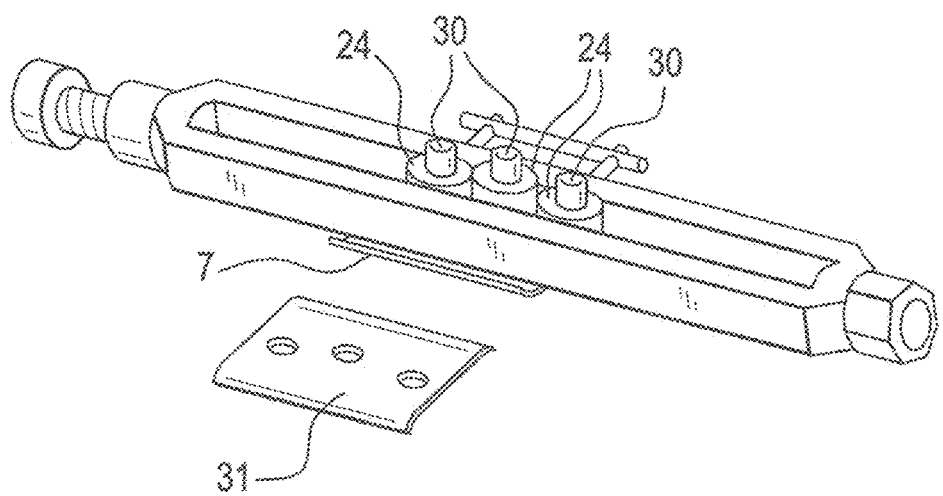
FIG. 4a shows an exploded internal view of clevis carriage bearing assembly.
Figure 4:
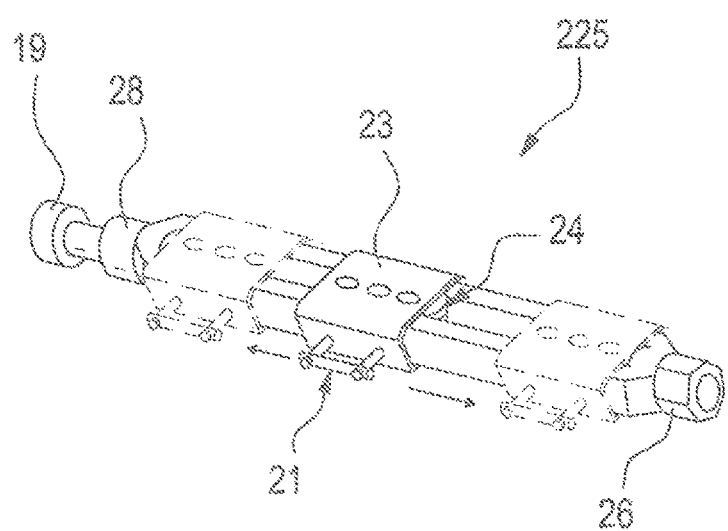
FIG. 4 shows an exploded view clevis carriage and carriage guide track.

FIG. 4 shows an exploded view of left clevis guide track 225 and left clevis carriage 23, showing the forward and rearward clevis carriage travel in dotted lines. The left clevis carriage 23 consists of roller bearings 24 which internally travel within the clevis guide track 225 and allows the clevis carriage 23 and clevis 21 to freely travel on the upper portion of the clevis guide tracks. As see FIG. 3, clevis carriages 23a, b move along clevis guide tracks 25a, b, and travel forward or backwards up to the bumpers front or rear bumpers 26 and 28.

As seen in FIG. 3, left and right clevis shaft adapters 19a, b attach the clevis guide tracks to the sulky shafts, and also attach the sulky shafts to the actuators 10a, b. Thus, providing another attachment point of the sulky force equalizer to the sulky shafts, an attachment point where force from the sulky force equalizer maintains even sulky shaft tips with the pulling horse.

FIG. 4a is an exploded internal view of a clevis carriage 23a, b, showing the inner half of split housing 7 and the outer half of split housing 31 with a bank of roller bearings 24. Each roller bearing 24 has a dual purpose bolt 30 which enables assembling the carriage housing 23 and provides axles for roller bearing motion.

FIG. 5 shows the last major component of the saddle mount actuator, a tandem mounted actuator 10 which is attached to the sulky shafts and the clevis carriages 23a, b (seen in FIG. 3). The attachment to the sulky shaft is obtained by wrap around left foot bracket 11 that mounts the cylinder portion of the actuators 10a, b to the left and right sulky shafts. Left and right rods 16a, b of the actuators 10a, b connect to the clevis carriages 23a, b and a left and right rod connectors 20a, b.

Finally, in FIG. 5, left rod 16 connects left fluid piston 130 and a left clevis carriage 23a, (seen in FIG. 3) through left connector 20. And each actuator has hollow cylinders divided by a slide piston 130. The fluid piston 130 separates fluid chambers of each actuator, the top chamber 140 and the bottom chamber 145.

Upper tubing 17 allows pressure equalization between fluid chambers 145a and 145b, lower tubing 15 allows pressure equalization between fluid chambers 140a and 145b. The upper and lower tubing allows fluid to shift sides and maintain equal chamber pressure, keeping the sulky shaft tips even with the horse.

Detailed Description of the Tandem Acting Actuator

FIGS. 6a, b and c show the operation of the sulky force equalizer in several phases, as the application of force differs while being propelled forward by the horse. The figures are cutaway views of the interior portion of the actuators fully assembled and attached to the clevis bearing assembly.

Figure 6C:
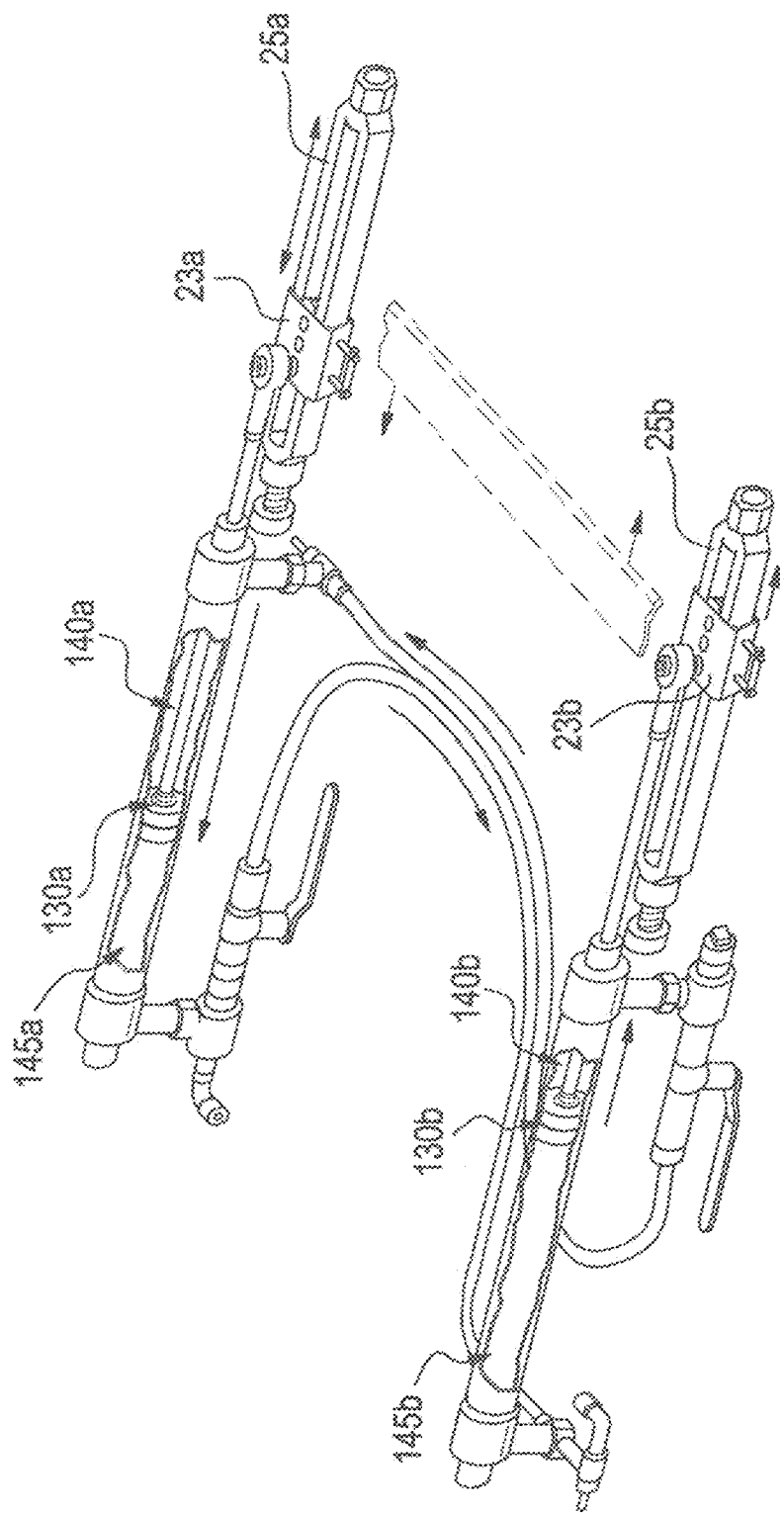
FIG. 6C shows an exploded cutaway view of the actuators with a greater amount of force being applied to the right clevis carriage by the horse.

A trotting horse with a sulky force equalizer connected between the sulky and horse follows the following approximate sequence:

(1) Suspension Phase FIG. 6a
(2) Left Stance Phase FIG. 6b
(3) Suspension Phase FIG. 6a
(4) Right Stance Phase FIG. 6c
(5) Cycle complete, repeat starting at (1) or (2)

Thus, a complete cycle starts at (1) or (2), cycles down to the end at (4) and (5), and the cycle repeats. Additionally, there are errant forces trying to separate the stationary-prone sulky from the moving horse, i.e., friction, wind resistance, gravity, etc. The purpose for the resilient connection between clevis carriages 23 and the harness of the horse is to capture the side-to-side movements of the horse, as well as the errant separating-type forces between the sulky and horse, and uses those forces to generate pressure in actuator chambers 140 and 145.

The left and right rolls of the horse and stray errant forces provide the energy to operate the sulky force equalizer. The sulky force equalizer compresses in one actuator on one side of the horse and causes the actuator on the other side to expand alternating from side to side (approximately three times a second), as described in the following description.

FIG. 6a is an exploded cutaway view of the actuators showing an equal amount of pulling force applied to clevis carriages 23a and 23b. This position usually occurs during the suspension phase as the horse trots, an equal pressure in chambers 140a and 140b, 145a and 145b, and allows the horse to pull the sulky with a balanced force on both shafts while maintaining parallel sulky shaft tips perpendicular with the horses harness.

FIG. 6b is an exploded cutaway view of the sulky force equalizer actuators 10a, b with the pistons and clevis positions showing a greater of pulling force applied to the left side of the force equalizer. This greater amount of force usually occurs during the left stance phase as the horse trots.

A detailed description of the internal and external component movements during fluid displacement is as follows: clevis carriage 23a and piston 130a are pulled forward by the horse, the sulky and shafts are attempting to separate or lose distance with the forward moving horse, as this movement occurs a compression of fluid in chamber 140a is displaced into chamber 140b. As the higher pressure fluid enters chamber 140b, piston 130b and clevis carriage 23b move rearward increasing the distance between the clevis carriage and the sulky shaft tip, forcibly pushing (by means of the harness connection) the right sulky shaft forward, gaining distance with the forward moving horse, and as the left shaft loses distance and the right shaft gains distance with the forward moving horse the fluid pressures in chambers 140a and 140b, 145a and 145b equalize allowing the horse to pull the sulky forward with an equal amount of force on each parallel shaft.

FIG. 6c is an exploded cutaway view of the force equalizer actuators 10a, b with the pistons and clevis positions showing a greater amount of pulling force being applied to the right side of the force equalizer. This greater amount of force usually occurs during the right stance phase as the horse trots.

A detailed description of the internal and external components movements during fluid displacement is as follows. The horse pulls clevis carriage 23b and fluid piston 130b forward. The sulky and shafts attempt to separate or lose distance with the horse, and as this movement occurs a compression of fluid in chamber 140b displaces into chamber 140a, the piston 130a and clevis carriage 23a move rearward increasing the distance between clevis 23a and the sulky shaft tip, forcibly pushing (by means of the harness connection) the left shaft forward gaining distance with the forward moving horse. As the right shaft loses distance and the left shaft gains distance with the forward moving horse, the fluid pressures in chambers 140a and 140b, 145a and 145b equalize allowing the horse to pull the sulky forward with an equal amount of force on each parallel shaft.

Thus, as the horse is in motion around the track, forces between the left and right sulky shafts alternate and the left or right pressure and the fluid flow described above repeats. During this process the sulky force equalizer captures the leftward or rightward force of the horse, converts those forces, redirects the forces and uses those captured forces to equalize the racehorse's pull on the sulky.

Force Analysis Mode

The sulky force equalizer is also capable of operating in a force analyzer mode (as seen in FIG. 2). The primary mode of operation for the sulky force equalizer is the racing mode, accomplished when valves 14a and 14b are in the open position, and the pulling force applied by the horse equalizes between the two parallel shafts of the sulky, enabling a smoother forward motion. Testing to confirm this equalization of force can be monitored with the pressure gauges 43. To operate the force analyzer to determine the pulling force applied by the horse to the sulkies parallel shafts individually, valves 14a and 14b are placed in the closed position, and this eliminates any crossover of fluid pressure.

As noted, the force analysis mode requires additional components that would normally not be installed for use during the race mode. These components would include the pressure gauge tubing 40 and 42, and pressure gauges 43. Once these components are in place, the test mode is set by closing the left and right ball valves 14a, b; this position allows a force test to determine the amount of force being applied to each individual parallel shaft. This will verify the actual imbalances of pulling forces by the horse, proving the need for a force-equalizing device, the sulky force equalizer, and also confirming the operation of the sulky force equalizer. Further analysis could include sulky design and performance testing, accessing track conditions, optimizing track designs, driver performance, as well as other test situations.

The force analysis mode can be configured test pressure in the tandem acting actuators four chambers 140a, b and 145a, b. A positive force can be monitored by connecting pressure gauges 43 to the fluid chambers 140a, b, and a negative force can be monitored by connecting pressure gauges 43 to chambers 145a, b.

Having described preferred embodiments of the invention, it will be understood to those skilled in the art that variations and modifications thereof fall within the spirit and scope of the invention. Those of skill in the art may effect alterations, modifications and variations to particular embodiments without departing from the scope of the invention, which is defined by the appended claims.

The invention claimed is:

1. A sulky force equalizer comprising:
two actuators, a left actuator attached to a left sulky shaft and a right actuator attached to a right sulky shaft; each actuator communicate via cross-connected fluid tubing; said sulky shafts comprising of a left carriage connected to a left side harness on the horse and the left actuator; the left carriage forming a resilient connection between the actuator body and the harness; capable of responding to forces of the horse and sulky; a right carriage connected to a right side harness of the horse and the right actuator; the right carriage forming a resilient connection between the actuator body and the harness; fluid pressure within the actuator chambers transfers between the left and right actuators via cross connected fluid tubing from a higher pressure chamber to a lower pressure chamber until the fluid pressure equalizes in the chambers; as fluid pressure equalizes, the sulky shafts and both actuator bodies maintain an even lateral position with the horse as the horse transitions throught his strides.

2. The sulky force equalizer of claim 1 further comprising left and right clevis guide tracks attached to sulky shaft tips and having an upper rail and a lower rail
whereby the left and right carriages freely travel forward and backward on the rails, creating a resilient connection with the harness of the horse, the carriages responding to the motions of the horse.

3. The sulky force equalizer of claim 2 further comprising the left and right clevis carriages having an inner housing and outer housing, and
a bank of roller bearings enclosed within the inner and outer housings, and the roller bearings traveling forward and backward within the clevis guide tracks.

4. The sulky force equalizer of claim 1 configured in a test mode wherein valves in the cross-connected fluid tubing are closed, eliminating the passage of fluid between the chambers, and the fluid is transmitted to tubing connected to the valves and pressure gauges.

5. A sulky force equalizer connected to sulky shafts and a racehorse harness, the apparatus comprising:
an actuator attached to the right sulky shaft and the right side harness,
an actuator attached to the left sulky shaft and the left side harness, and
each actuator monitoring the position of the other actuator,
controlling the position of the other actuator and its attached shaft,
equalizing the horse's pull on the sulky, and
keeping the tips of the sulky shafts even; wherein the actuators comprising
a) a right cylinder connected to the right sulky shaft, a left cylinder connected to the left sulky shaft;
b) each cylinder having two ends, one end closed by a cylinder bottom and the other end closed by a cylinder head;
c) a left and a fight piston each piston connected to a piston rod, each piston rod sealingly coming out of the cylinder heads and connected to the left and fight sides of the race horse harness;
d) the pistons dividing the inside of the left and right cylinders into two sealed, variable-volume chambers, an upper chamber on the cylinder head side and a bottom chamber on the cylinder bottom side,
e) each chamber having a port through which fluid enters and leaves the chamber, f) tubing attached to the ports of the bottom chambers, connecting the bottom chambers;
g) tubing attached to the ports of the upper chambers; connecting the upper chambers;
h) the piston and piston rod assembly moving forward and backward within the cylinder according to the flow of a pressurized fluid in the chambers;
i) as the horse trots and rolls from side to side, propelling the sulky forward, the flow of the pressurized fluid in the chambers is approximately as follows:

when the extremities of the horse lean left, the left piston is pulled forward, the left piston drives fluid out of the left upper chamber, through the upper tubing, and into the fight upper chamber, the pressurized fluid in the fight upper chamber drives the right piston down, forcing fluid out the right bottom chamber and into the left bottom chamber, and the pressurized fluid in the left bottom chamber pushes the left piston forward;

the cycling fluid continues until the pressure in the chambers of the left and fight pistons equalizes, when the extremities of the horse lean right, the right piston is pulled forward, the right piston drives fluid out of the right upper chamber, through the upper tubing, and into the left upper chamber, the pressurized fluid in the left upper chamber drives the left piston down, forcing fluid out the left bottom chamber and into the right bottom chamber, and the pressurized fluid in the right bottom chamber pushes the right piston forward;

the cycling fluid continues until the pressure in the chambers of the left and right pistons equalizes, and the equal chamber pressure provides equal pressure on the pistons, and equalizes the racehorse's pull on the sulky and keeps the tips of the sulky shafts even.

6. The apparatus of claim 5 further comprising:
a) a left carriage connected to the left harness of the horse and the left rod of the piston and forming a resilient connection with the horse, capable of responding to forces and motions of the horse and forces from the sulky;
b) a right carriage connected to the right harness of the horse and the right rod of the piston and forming a resilient connection with the horse, capable of responding to forces and motions of the horse and forces from the sulky.

7. The sulky force equalizer of claim 6 wherein the pressurized gas is air.

8. The sulky force equalizer of claim 6 further comprising the left and right clevis carriages having an inner housing and outer housing, and
a bank of roller bearings enclosed within the inner and outer housings, and the roller bearings traveling forward and backward within the clevis guide tracks.

9. The sulky force equalizer of claim 6 configured in a test mode wherein valves between the right upper chamber and the left upper tubing are closed, eliminating the passage of fluid between the upper chambers, and the fluid in the upper chambers is transmitted to tubing connected to the valves and pressure gauges.

10. The sulky force equalizer of claim 5 wherein the pressurized fluid is a gas.

11. The sulky force equalizer of claim 5 further comprising left and right clevis guide tracks attached to sulky shaft tips and having an upper rail and a lower rail whereby the left and right carriages freely travel forward and backward on the rails, creating a resilient connection with the harness of the horse, the carriages responding to the motions of the horse.

12. The sulky force equalizer of claim 5 further comprising left and right quick hitch couplers connected to the left and right sides of the harness of the horse;
the left carriage connected to the left quick hitch coupler, and
the right carriage connected to the right quick hitch coupler.

13. An apparatus for connecting a horse to the shafts of the sulky cart, the apparatus capturing and redirecting errant forces that hinder the forward motion of the horse and utilizing those forces to equalize any imbalance of the sulky shaft positions, the apparatus comprising:
a) a right connection device, having a horse-end and a device-end, and the horse-end connected to a right side harness of the horse;
a right carriage connected to the device-end of the right connection device;
a right rod having a first end and a second end, the first end connected to the right carriage,
a right piston, having a top and bottom side, the top side connected to the second end of the right rod; and
the right connection device, right carriage, right rod, and right piston, freely traveling as a unit and creating a resilient, responsive connection between the motions of the horse and the sulky shafts;
b) a right hollow cylinder having two inner ends, a top end and a bottom end, the right piston inside the cylinder and extending through a hole in the top end of the cylinder and sealingly moving through the hole, and the right cylinder connected to the right shaft of the sulky,
c) a right upper chamber and a right lower chamber in the right hollow cylinder, the chambers formed by the sealingly moveable right piston, the upper chamber formed on the top side of the piston and the lower chamber formed by the bottom side of the piston;
d) a left connection device, having a horse-end and a device-end, and the horse-end connected to a left side harness of the horse;
a left carriage connected to the device-end of the left connection device;
a left rod having a first end and a second end, the first end connected to the left carriage,
a left piston, having a top and bottom side, the top side connected to the second end of the left rod; and
the left connection device, left carriage, left rod, and left piston freely traveling as a unit forwards and backwards, and creating a resilient, responsive connection between the motions of the horse and the sulky shafts;
e) a left hollow cylinder having two inner ends, a top end and a bottom end, the right piston inside the cylinder and extending through a hole in the top end of the cylinder and sealingly moving through the hole, and the right cylinder connected to the right shaft of the sulky,
f) a left upper chamber and a left lower chamber in the left hollow cylinder, the chambers formed by the sealingly moveable left piston, the upper chamber formed on the top side of the piston and the lower chamber formed by the bottom side of the piston;
g) two flexible tubes, an upper tubing connecting the upper chambers of the right and left cylinders;
h) a lower tubing connecting the lower chambers of the right and left cylinders;

wherein when pressure from the horse pulls the right connection device forward, the right carriage and right piston move forward as a unit forcing fluid out the right upper chamber, through the upper tubing, into the left upper chamber, pressing down on the left piston, forcing fluid out of the lower left chamber, and pressing the right piston up, and the right to left fluid cycling continues, until— the sulky shaft positions begin to regain an even lateral position, the imbalance of pulling forces begin to equalize, the internal fluid pressures within the chambers begin to equalize, and the fluid cycling continues until an equilibrium of forces in the chambers occurs; and wherein when pressure from the horse pulls the left connection device forward, the left carriage and left piston move forward as a unit forcing fluid out the left upper chamber, through the upper tubing, into the right upper chamber, pressing down on the right piston, forcing fluid out of the lower right chamber, and pressing the left piston up, and the left to right fluid cycling continues, until— the sulky shaft positions begin to regain an even lateral position, the imbalance of pulling forces begin to equalize, the internal fluid pressures within the chambers begin to equalize, and the fluid cycling continues until an equilibrium of forces in the chambers occurs.

14. The sulky force equalizer of claim 13 wherein the connection devices are clevises.

15. The sulky force equalizer of claim 13 configured in a test mode wherein valves between the right upper chamber and the left upper tubing are closed, eliminating the passage of fluid between the upper chambers, and the fluid in the upper chambers is transmitted to tubing connected to the valves and pressure gauges.

16. The sulky force equalizer of claim 13 wherein the two cylinders are industry standard miniature pneumatic actuators with stainless steel cylinder construction.

* * * * *